United States Patent [19]

Hayashi et al.

[11] Patent Number: 5,013,796

[45] Date of Patent: May 7, 1991

[54] NITRILE GROUP-CONTAINING HIGHLY SATURATED COPOLYMER RUBBER AND RUBBER COMPOSITION HAVING IMPROVED COLD RESISTANCE

[75] Inventors: Sachio Hayashi, Tokyo; Yoichiro Kubo, Kanagawa; Noboru Watanabe, Kanagawa; Yoshiaki Aimura, Kanagawa, all of Japan

[73] Assignee: Nippon Zeon Co., Ltd., Tokyo, Japan

[21] Appl. No.: 575,702

[22] Filed: Aug. 31, 1990

Related U.S. Application Data

[62] Division of Ser. No. 543,013, Jun. 25, 1990, which is a division of Ser. No. 326,862, Mar. 21, 1989, Pat. No. 4,956,417.

[30] Foreign Application Priority Data

Mar. 24, 1988 [JP] Japan .................................. 63-70454

[51] Int. Cl.$^5$ ................................................ C08F 8/04
[52] U.S. Cl. .................. 525/326.2; 525/338; 525/339
[58] Field of Search ...................... 525/326.2, 338, 339

[56] References Cited

U.S. PATENT DOCUMENTS

| | | | |
|---|---|---|---|
| 861,054 | 4/1969 | Dickakian | 525/339 |
| 3,264,272 | 8/1966 | Rees | 525/339 |
| 4,001,193 | 1/1977 | van Bonin et al. | 525/379 |
| 4,404,329 | 9/1983 | Maeda et al. | 525/329.2 |
| 4,525,539 | 6/1985 | Feirung | 525/326.2 |
| 4,828,923 | 5/1989 | Nakagawa et al. | 525/326.2 |
| 4,829,128 | 5/1989 | Boding et al. | 525/338 |

*Primary Examiner*—Bernard Libman
*Attorney, Agent, or Firm*—Armstrong, Nikaido, Marmelstein, Kubovcik & Murray

[57] ABSTRACT

A nitrile group-containing, highly saturated copolymer rubber is disclosed, the copolymer chain of which is comprised of (1) 5 to 40% by weight of units of an unsaturated nitrile monomer, (2) 1 to 80% by weight of units of a monomer selected from a fluorine-free unsaturated carboxylic acid ester monomer and a fluorine-containing vinyl monomer and (3) up to 20% by weight of units of a conjugated diene monomer, with the balance being (4) units of a hydrogenated conjugated diene monomer, wherein the sum of the contents of the monomer units (1) and (2) is 30 to 90% and the sum of the contents of the monomer units (3) and (4) is 10 to 70% by weight. This copolymer rubber results in a rubber composition having an improved cold resistance.

12 Claims, No Drawings

NITRILE GROUP-CONTAINING HIGHLY SATURATED COPOLYMER RUBBER AND RUBBER COMPOSITION HAVING IMPROVED COLD RESISTANCE

This is a division of application Ser. No. 543,013 filed June 25, 1990, which is a division of application Ser. No. 326,862, filed Mar. 21, 1989, now U.S. Pat. No. 4,956,417.

BACKGROUND OF THE INVENTION (1) Field of the Invention

The present invention relates to a rubber composition having an improved cold resistance, and comprising, as a rubber component, a nitrile group-containing copolymer having a specific composition and a reduced amount of an unsaturated bond.

(2) Description of the Related Art

When used for a control of automobile exhaust emissions, rubber parts disposed in the vicinity of an engine must have a high heat resistance. To meet this demand, a nitrile group-containing, highly saturated copolymer rubber formed by hydrogenating a part or all of carbon-to-carbon double bond-containing monomer units in a nitrile group-containing hydrocarbon rubber such as an acrylonitrile/butadiene copolymer rubber (hereinafter referred to as "NBR") was developed and is now in use (see U.S. Pat. No. 4,404,329).

This rubber has an ozone resistance and heat resistance superior to those of conventional NBR, but has a cold resistance inferior to that of NBR in some cases depending upon the nitrile group content or the unsaturation degree of the main chain of the polymer.

Due to recent advances in this field, the range of temperatures of the atmospheres in which various rubber parts are used has been extended to lower and higher temperatures and therefore, the development of a nitrile group-containing, highly saturated copolymer rubber composition having an improved cold resistance is urgently required in this field.

In a conventional NBR, a reduction of the nitrile group content will improve the cold resistance. For example, in the TR test specified in ASTM D-1329 (an elongated test piece is frozen, the temperature is gradually elevated, and the recovery of the elongated test piece is measured: more specifically, the temperature at which the length of the test piece is contracted, i.e., recovered, by 10% by elevation of the temperature is designated as TR10), NBR having a bonded acrylonitrile content of 37% by weight shows a TR10 value of −20.5° C., but if the bonded acrylonitrile content is reduced to 28% by weight, the TR10 value is lowered to −31° C.

Nevertheless, a nitrile group-containing, highly saturated copolymer rubber is different from NBR in that, even if the nitrile group content is reduced, the cold resistance is not always improved. For example, the TR10 of a rubber comprising 5% by weight of butadiene units and 37% by weight of acrylonitrile units, with the balance being hydrogenated butadiene units, is −24.5° C. but the TR10 of a rubber comprising 5% by weight of butadiene units and 28% by weight of acrylonitrile units, with the balance being hydrogenated butadiene units, is −20° C., and the cold resistance is not improved even if the acrylonitrile content is reduced.

SUMMARY OF THE INVENTION

Therefore, a primary object of the present invention is to provide a nitrile group-containing, highly saturated copolymer rubber having an improved cold resistance, and a composition comprising this copolymer rubber.

More specifically, in accordance with one aspect of the present invention, there is provided a nitrile group-containing, highly saturated copolymer rubber the copolymer chain of which comprises (1) 5 to 40% by weight of units of an unsaturated nitrile monomer, (2) 1 to 80% by weight of units of a monomer selected from a fluorine-free unsaturated carboxylic acid ester and a fluorine-containing vinyl monomer, and (3) up to 20% by weight of units of a conjugated diene monomer, with the balance being (4) units of a hydrogenated conjugated diene monomer, wherein the sum of the contents of the monomer units (1) and monomer units (2) is 30% to 90% by weight and the sum of the contents of the monomer units (3) and monomer units (4) is 10 to 70% by weight.

In accordance with another aspect of the present invention, there is provided a rubber composition having an improved cold resistance, which comprises a nitrile group-containing, highly saturated copolymer rubber as set forth above, and additives.

When the rubber composition of the present invention is used, a cured product (comprising 40 parts by weight of SRF carbon black and 100 parts by weight of the rubber without a plasticizer) having a TR10 lower than −26° C., which is not attainable when the butadiene units of NBR are highly hydrogenated, can be prepared.

DESCRIPTION OF THE PREFERRED EMBODIMENTS

From the viewpoint of the oil resistance and cold resistance, in the nitrile group-containing, highly saturated copolymer of the present invention, the content of the nitrile group-containing monomer units (1) is 5 to 40% by weight, preferably 10 to 35% by weight. If the content of the monomer units (1) is lower than 5% by weight, the oil resistance is poor, and if the content of the monomer units (1) exceeds 40% by weight, there is little improvement of the cold resistance.

The content of the units (2) of the fluorine-free unsaturated carboxylic acid ester monomer and or the fluorine-containing vinyl monomer is 1 to 80% by weight preferably 15 to 60% by weight. If the content of the monomer units (2) is lower than 1% by weight, there is little improvement of the cold resistance and if the content of the monomer units (2) exceeds 80% by weight, the cold resistance is improved but the oil resistance becomes poor.

From the viewpoint of the heat resistance, the content of the conjugated diene monomer units (3) in the copolymer rubber is up to 20% by weight, preferably up to 15% by weight. The content other than the content of the monomer units (1), (2) and (3) is composed of the hydrogenated conjugated diene monomer units (4).

Moreover, to maintain a good balance between the oil resistance and cold resistance, the sum of the contents of the monomer units (1) and (2) is 30 to 90% by weight, preferably 40 to 90% by weight. Surprisingly, the cold resistance is not improved outside this range. Furthermore, to maintain a good balance between the heat resistance and cold resistance, the sum of the contents of the monomer units (3) and (4) is 10 to 70% by weight, preferably 10 to 60% by weight.

The content of the monomer units (2), the sum of the contents of the monomer units (1) and (2) and the sum of the contents of the monomer units (3) and (4), which are desired for the improvement of the cold resistance, vary depending upon the particular fluorine-free unsaturated carboxylic acid ester monomer and/or the particular fluorine-containing vinyl monomer. More specifically, where a fluorine-free unsaturated carboxylic acid ester is used as the monomer for forming the monomer units(2), it is preferable that the content of the monomer units (2) is 15 to 60% by weight, the sum of the contents of the monomer units (1) and (2) is 40 to 90% by weight, more preferably 55 to 90% by weight, and the sum of the contents of the monomer units (3) and (4) is 10 to 60% by weight, more preferably 10 to 45 by weight. Where a fluorine-containing vinyl monomer is used as the monomer for forming the monomer units (2), it is preferable that the content of the monomer units (2) is 5 to 60% by weight, the sum of the contents of the monomer units (1) and (2) is 40 to 90% by weight, and the sum of the contents of the monomer units (3) and (4) is 10 to 60% by weight.

The nitrile group-containing, highly saturated copolymer rubber of the present invention is obtained by hydrogenating conjugated monomer units in a copolymer rubber, formed by copolymerizing (1) an unsaturated nitrile monomer, (2) at least one monomer selected from fluorine-free unsaturated carboxylic acid esters and fluorine-containing vinyl monomers, and (3) a conjugated diene monomer by a conventional method.

The monomers to be used for the production of the copolymer rubber of the present invention will now be described.

As the unsaturated nitrile monomer, there can be mentioned, for example, acrylonitrile, methacrylonitrile and α-chloroacrylonitrile.

As the fluorine-free unsaturated carboxylic acid ester monomer, there can be mentioned, for example, alkyl acrylates and methacrylates having 1 to 18 carbon atoms in the alkyl group, such as methyl acrylate, ethyl acrylate, propyl acrylate, n-butyl acrylate, isobutyl acrylate, n-pentyl acrylate, n-hexyl acrylate, 2-methylpentyl acrylate, n-octyl acrylate, 2-ethylhexyl acrylate, n-dodecyl acrylate, methyl methacrylate and ethyl methacrylate; alkoxyalkyl acrylates having 2 to 12 carbon atoms in the alkoxyalkyl group, such as methoxymethyl acrylate, methoxyethyl acrylate, ethoxyethyl acrylate, butoxyethyl acrylate, ethoxy-propyl acrylate, methoxyethoxy acrylate and ethoxybutoxy acrylate; cyanoalkyl acrylates having 2 to about 12 carbon atoms in the cyanoalkyl group, such as α- and β-cyanoethyl acrylates, α-, β- and γ-cyanopropyl acrylates, cyanobutyl acrylate, cyanohexyl acrylate and cyano-octyl acrylate; hydroxyalkyl acrylates having 1 to 18 carbon atoms in the hydroxyalkyl group such as 2-hydroxyethyl acrylate and hydroxypropyl acrylate; aminoalkyl esters of ethylenically unsaturated carboxylic acids, having 1 to 12 carbon atoms in the aminoalkyl group, such as methylaminoethyl acrylate, t-butylaminoethyl acrylate, dimethylaminoethyl acrylate, dimethylaminopropyl acrylate, diethylaminoethyl acrylate, dibutylaminoethyl acrylate, methylaminoethyl methacrylate, t-butylaminoethyl methacrylate, dimethylaminoethyl methacrylate, dimethylaminopropyl acrylate, diethylaminoethyl methacrylate and dibutylaminoethyl methacrylate; and mono- and di-alkyl esters of unsaturated carboxylic acids, having 1 to 8 carbon atoms in the alkyl group, such as monoethyl maleate, dimethyl maleate, dimethyl fumarate, diethyl fumarate, di-n-butyl fumarate, di-2-ethylhexyl fumarate, dimethyl itaconate, and di-n-butyl itaconate.

Of these fluorine-free unsaturated carboxylic acid ester monomers, alkyl acrylates and methacrylates having 4 to 12 carbon atoms in the alkyl group, aminoalkyl acrylates and methacrylates having 1 to 12 carbon atoms in the aminoalkyl group, and hydroxyalkyl acrylates having 1 to 18 carbon atoms in the hydroxyalkyl group are preferable.

As the fluorine-containing vinyl monomer, there can be mentioned, for example, fluoroalkyl acrylates and methacrylates having 3 to 21 fluorine atoms in the fluoroalkyl group, such as trifluoroethyl acrylate, tetrafluoropropyl acrylate, pentafluoropropyl acrylate, heptafluorobutyl acrylate, octafluoropentyl acrylate, nonafluoropentyl acrylate, undecafluorohexyl acrylate, pentadecafluoro-octyl acrylate, heptadecafluorononyl acrylate, heptadecafluorodecyl acrylate, nonadecafluorodecyl acrylate, trifluoroethyl methacrylate, tetrafluoropropyl methacrylate, octafluoropentyl methacrylate, dodecafluoroheptyl methacrylate, pentadecafluoro-octyl acrylate, and hexadecafluorononyl methacrylate; fluorine-substituted benzyl acrylates and methacrylates such as fluorobenzyl acrylate, difluorobenzyl acrylate, fluorobenzyl methacrylate and difluorobenzyl methacrylate; fluoroalkyl vinyl ethers having 1 to 8 carbon atoms in the fluoroalkyl group, such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; and o- and p-trifluoromethylstyrenes, vinyl pentafluorobenzoate, difluoroethylene and tetrafluoroethylene. Of these fluorine-containing vinyl monomers fluoroalkyl acrylates and methacrylates having 3 to 21 fluorine atoms in the fluoroalkyl group are preferable.

As the conjugated diene monomer, there can be mentioned, for example, 1,3-butadiene, 2,3-dimethylbutadiene, isoprene and 1,3-pentadiene.

Parts of the above-mentioned monomers can be substituted by monomers copolymerizable with the above-mentioned monomers, for example, vinyl monomers such as styrene and vinylpyridine and non-conjugated diene monomers such as vinylnorbornene, dicyclopentadiene and 1,4-hexadiene, so long as the intended object of the present invention can be attained.

The nitrile group-containing, highly saturated copolymer rubber of the present invention is obtained by copolymerizing the above-mentioned monomers by customary polymerization procedures, and then hydrogenating the conjugated diene monomer units of the thus obtained copolymer rubber.

For example, there can be mentioned copolymer rubbers obtained by hydrogenating the butadiene units and isoprene units of copolymer rubbers such as a butadiene/butyl acrylate/acrylonitrile copolymer rubber, a butadiene/isoprene/butyl acrylate/acrylonitrile copolymer rubber, a butadiene/2-ethylhexyl acrylate/acrylonitrile copolymer rubber, a butadiene/trifluoroethyl acrylate/acrylonitrile copolymer rubber, a butadiene/trifluoroethyl methacrylate/acrylonitrile copolymer rubber, a butadiene/diethylaminoethyl methacrylate/acrylonitrile copolymer rubber and a butadiene/di-n-butyl itaconate/acrylonitrile copolymer rubber.

A rubber composition of the present invention is prepared by mixing the nitrile group-containing, highly saturated copolymer rubber with various additives customarily used in the rubber industry in a conventional mixer. The kinds and amounts incorporated of the additives are determined in accordance with the intended object (use) of the rubber composition. Usually, the rubber composition comprises, based on the weight of the rubber composition, 25 to 90% by weight of the nitrile group-containing, highly saturated copolymer rubber of claim and 75 to 10% by weight of additives.

As the additives, there can be mentioned sulfur-curing systems comprising a sulfur donor compound such as sulfur or tetramethylthiuram disulfide, zinc oxide, stearic acid and a curing promoter of the guanidine, thiazole, thiuram or dithiosulfate type; organic peroxide-curing systems comprising an organic peroxide such as dicumyl peroxide or 2,5-dimethyl-2,5-di(t-butyl-peroxy)hexine-3 and a cross-linking agent such as triallyl cyanurate or trimethylolpropane trimethacrylate; carbon blacks of various grades such as SRF, HAF and FEA, reinforcers such as silica, talc and calcium carbonate, fillers, plasticizers, process oils, processing assistants, and aging-preventing agents.

By using the rubber composition of the present invention, a cured product having a TR10 lower than $-26°$ C., which is not attainable by a composition comprising a conventional highly saturated NBR, can be prepared (40 parts by weight of SRF carbon black and 100 parts by weight of the rubber; a plasticizer is not incorporated).

The rubber composition of the present invention has the characteristics of the nitrile group-containing, highly saturated copolymer rubber, such as a high ozone resistance, high heat resistance, and high oil resistance, and further, the rubber composition has an excellent cold resistance. Accordingly, the rubber composition of the present invention is effective for use in the production of rubber products which are in contact with an oil or gas during use, and for which a high heat resistance and oil resistance are required, especially rubber products for which a high cold resistance is required.

The rubber composition of the present invention can be widely used in the production of, for example, sealing rubber products such as an O-ring, a packing or a gasket used for a bearing of a rotating device; belts such as a conveyor belt, a V-belt or a timing belt; valves and valve-sealing materials; oil well packers, well-head sealing materials, BOP (blow-out preventers) and bladders; cushioning materials and vibration insulators; ship and automobile bearing seals such as crank shaft seals, bearing seals, rotary seals of accelerators and stern tube seals; various diaphragms; and hoses such as automobile fuel hoses, marine hoses, riser hoses and flow line hoses, and further, can be used in the energy field, for example, as articles for geothermal electric power generation.

The present invention will now be described in detail with reference to the following examples. Note, in the examples, comparative examples and referential examples, all of "parts" and "%" are by weight unless otherwise indicated.

EXAMPLES 1 THROUGH 10 AND COMPARATIVE EXAMPLES 1 THROUGH 10

An acrylonitrile/butadiene copolymer rubber or acrylonitrile/butadiene/fluorine-free unsaturated carboxylic acid ester monomer terpolymer rubber, prepared by a customary emulsion polymerization, was dissolved in methyl isobutyl ketone, and the butadiene units of the rubber were partially hydrogenated in a pressure-resistant vessel by using a Pd/silica catalyst, to obtain a highly saturated copolymer rubber. The contents of the monomer units in the rubber are shown in Table 1.

The obtained highly saturated copolymer rubber was then mixed with additives shown in Table 2 on a cooling roll, to obtain a rubber composition, and the rubber composition was heated under pressure at 170° C. for 15 minutes to obtain a cured product. The TR test of the cured product was carried out according to ASTM D-1329, and the other physical properties of the cured product were measured according to JIS (Japanese Industrial Standard) K-6301. The results are shown in Table 1.

TABLE 1

| | Examples of the Invention | | | | | | | | | |
|---|---|---|---|---|---|---|---|---|---|---|
| | 1 | 2 | 3 | 4 | 5 | 6 | 7 | 8 | 9 | 10 |
| Monomer units (%): | | | | | | | | | | |
| Acrylonitrile | 15 | 14 | 14 | 15 | 15 | 20 | 20 | 20 | 20 | 20 |
| Diethyl itaconate | 42 | — | — | — | — | 37 | — | — | — | — |
| Di-n-butyl itaconate | — | 45 | — | — | — | — | 38 | — | — | — |
| Diethylaminoethyl methacrylate | — | — | 45 | — | — | — | — | 39 | — | — |
| Butyl acrylate | — | — | — | 43 | — | — | — | — | 35 | — |
| 2-Ethylhexyl acrylate | — | — | — | — | 45 | — | — | — | — | 38 |
| Butadiene | 5 | 5 | 13 | 7 | 5 | 5 | 5 | 6 | 10 | 8 |
| Hydrogenated butadiene | 38 | 36 | 28 | 35 | 35 | 38 | 37 | 35 | 35 | 34 |
| Physical properties in normal state: | | | | | | | | | | |
| Tensile strength (kg/cm$^2$) | 186 | 190 | 182 | 210 | 213 | 214 | 203 | 190 | 210 | 224 |
| Elongation (%) | 230 | 250 | 530 | 250 | 240 | 370 | 240 | 380 | 230 | 270 |
| Hardness (points) | 61 | 58 | 57 | 61 | 62 | 61 | 61 | 57 | 60 | 64 |
| Change in physical properties after heat aging at 150° C. for 72 hours: | | | | | | | | | | |
| Change ratio of tensile strength (%) | −5 | −12 | −34 | −18 | −11 | −1 | −20 | −24 | −16 | −15 |
| Change of elongation (%) | −15 | −12 | −30 | −20 | −25 | −12 | −21 | −23 | −22 | −19 |
| Change of hardness | −4 | −2 | −2 | −1 | −2 | −3 | −1 | −1 | −1 | −1 |
| TR-10 (°C.) | −35 | −39 | −41 | −30 | −26 | −33 | −35 | −38 | −27 | −26 |

| | Comparative Examples | | | | | | | |
|---|---|---|---|---|---|---|---|---|
| | 1 | 2 | 3 | 6 | 7 | 8 | 9 | 10 |

TABLE 1-continued

| Monomer units (%): | | | | | | | | |
|---|---|---|---|---|---|---|---|---|
| Acrylonitrile | 15 | 14 | 14 | 20 | 20 | 45 | 20 | 34 |
| Diethyl itaconate | 10 | — | — | — | — | 10 | — | — |
| Di-n-butyl itaconate | — | 10 | — | 5 | — | — | — | — |
| Diethylaminoethyl methacrylate | — | — | 10 | — | 5 | — | — | — |
| Butyl acrylate | — | — | — | — | — | — | — | — |
| 2-Ethylhexyl acrylate | — | — | — | — | — | — | — | — |
| Butadiene | 5 | 5 | 13 | 10 | 10 | 5 | 5 | 5 |
| Hydrogenated butadiene | 70 | 71 | 63 | 65 | 65 | 40 | 75 | 61 |
| Physical properties in normal state: | | | | | | | | |
| Tensile strength (kg/cm$^2$) | 210 | 200 | 200 | 220 | 210 | 230 | 190 | 265 |
| Elongation (%) | 270 | 280 | 380 | 290 | 350 | 300 | 300 | 430 |
| Hardness (points) | 61 | 59 | 63 | 60 | 62 | 62 | 65 | 65 |
| Change in physical properties after heat aging at 150° C. for 72 hours: | | | | | | | | |
| Change ratio of tensile strength (%) | −7 | −15 | −35 | −12 | −32 | −10 | −8 | −6 |
| Change of elongation (%) | −20 | −20 | −19 | −17 | −26 | −15 | −10 | −7 |
| Change of hardness | +1 | +2 | +3 | +1 | +2 | +1 | +2 | +5 |
| TR-10 (°C.) | −18 | −22 | −15 | −15 | −17 | −17 | −10 | −24 |

TABLE 2

(Recipe)

| Highly saturated copolymer rubber | 100 parts |
|---|---|
| Zinc oxide | 5 parts |
| Stearic acid | 1 part |
| SRF carbon black | 40 parts |
| Peroximon F40[1] | 5 parts |

Note
[1] m.p-di-isopropylbenzene α,α'.-bis-t-butyl peroxide supplied by Montecatini (Italy)

As apparent from Comparative Examples 1 through 8 in Table 1, the cold resistance (TR10) of a copolymer rubber containing unsaturated carboxylic acid ester units which fails to satisfy the requirements of the present invention, is not improved.

EXAMPLES 11 THROUGH 21 AND COMPARATIVE EXAMPLES 11 THROUGH 14

A rubber composition was prepared according to a recipe shown in Table 2 by using a highly saturated copolymer rubber shown in Table 3, which was prepared in the same manner as described in Example 1, and the rubber composition was heated under pressure at 170° C. for 15 minutes to obtain a cured product having the properties shown in Table 3.

TABLE 3

| | Examples of the Invention | | | | | | | | | | | Comparative Examples | | | |
|---|---|---|---|---|---|---|---|---|---|---|---|---|---|---|---|
| | 11 | 12 | 13 | 14 | 15 | 16 | 17 | 18 | 19 | 20 | 21 | 11 | 12 | 13 | 14 |
| Monomer units (%): | | | | | | | | | | | | | | | |
| Acrylonitrile | 23 | 28 | 34 | 22 | 28 | 23 | 34 | 25 | 32 | 24 | 31 | 21 | 25 | 24 | 25 |
| Trifluoroethyl acrylate | 20 | 15 | 10 | 32 | 23 | — | — | — | — | — | — | 5 | — | — | — |
| Trifluoroethyl methacrylate | — | — | — | — | — | 22 | 10 | — | — | — | — | — | — | — | — |
| Tetrafluoropropyl acrylate | — | — | — | — | — | — | — | 30 | 19 | — | — | — | 3 | — | — |
| Octafluoropentyl acrylate | — | — | — | — | — | — | — | — | — | 30 | 20 | — | — | 3 | — |
| Butadiene | 10 | 10 | 10 | 5 | 5 | 5 | 10 | 5 | 5 | 5 | 5 | 5 | 5 | 5 | 5 |
| Hydrogenated butadiene | 47 | 47 | 46 | 41 | 44 | 50 | 46 | 40 | 44 | 41 | 44 | 69 | 67 | 68 | 70 |
| Physical properties in normal state: | | | | | | | | | | | | | | | |
| Tensile strength (kg/cm$^2$) | 223 | 210 | 238 | 243 | 263 | 206 | 246 | 224 | 254 | 210 | 245 | 200 | 230 | 240 | 270 |
| Elongation (%) | 290 | 260 | 260 | 220 | 300 | 280 | 320 | 240 | 280 | 220 | 280 | 290 | 290 | 300 | 260 |
| Hardness (points) | 66 | 65 | 65 | 65 | 66 | 64 | 64 | 71 | 70 | 70 | 70 | 64 | 63 | 65 | 64 |
| Change in physical properties after heat aging at 150° C. for 72 hours: | | | | | | | | | | | | | | | |
| Change ratio of tensile strength (%) | −26 | −32 | −12 | −14 | −8 | −31 | −6 | −9 | −8 | ±0 | −8 | −10 | −16 | −20 | −20 |
| Change of elongation (%) | −23 | −25 | −20 | −14 | −13 | −29 | −22 | −12 | −21 | −14 | −21 | −13 | −24 | −20 | −22 |
| Change of hardness | +2 | +1 | +2 | +2 | +2 | +2 | +2 | +1 | +3 | +2 | +3 | +3 | +5 | −4 | +6 |
| TR-10 (°C.) | −28 | −29 | −30 | −30 | −30 | −28 | −26 | −30 | −29 | −30 | −29 | −15 | −19 | −18 | −14 |

EXAMPLE 22 AND COMPARATIVE EXAMPLE 15

Highly saturated copolymer rubbers having the monomer units shown in Table 4 were prepared in the same manner as described in Example 1 by using a butadiene/isoprene/butyl acrylate/acrylonitrile copolymer (composition ratio = 52/10/10/28) and a butadiene/isoprene/acrylonitrile copolymer rubber composition ratio = 62/10/28) for comparison.

Rubber compositions were obtained by mixing the copolymer rubbers with additives shown in Table 5 on a roll, the rubber compositions were heated under pressure at 160° C. for 20 minutes to obtain cured products, and the characteristic properties thereof were measured. The results are shown in Table 4.

TABLE 4

| | Example 22 | Comparative Example 15 |
|---|---|---|
| Monomer units (%): | | |
| Acrylonitrile | 28 | 28 |
| Butyl acrylate | 10 | — |
| Diene | 11 | 11 |
| Hydrogenated diene | 51 | 61 |
| Physical properties in normal state: | | |
| Tensile strength (kg/cm$^2$) | 239 | 252 |
| Elongation (%) | 240 | 300 |
| Hardness (points) | 64 | 63 |
| Change in physical properties after heat aging at 150° C. for 72 hours: | | |
| Change ratio of tensile strength (%) | −16 | −17 |
| Change of elongation (%) | −28 | −29 |
| Change of hardness (points) | +4 | +5 |
| TR-10 (°C.) | −30 | −21.5 |

TABLE 5

| (Recipe) | |
|---|---|
| Highly saturated copolymer rubber | 100 parts |
| Zinc oxide | 5 parts |
| Stearic acid | 1 part |
| Sulfur | 0.5 part |
| SRF carbon black | 40 parts |
| Tetramethylthiuram disulfide | 2 parts |
| 2-Mercaptobenzothiazole | 0.5 part |

EXAMPLE 23

Each of the hydrogenated to polymer rubbers of the present invention obtained in Example 1 through 21 was mixed with the additives shown in Table 5. The obtained rubber compositions were heated under pressure at 160° C. for 20 hours, and the TR10 of each of the obtained cured products was measured. The results were substantially the same as the results obtained in Examples 1 through 21.

We claim:

1. A nitrile group-containing, highly saturated copolymer rubber, the copolymer chain of which comprises, based on the weight of the copolymer chain, (1) 5 to 40% by weight of units of an unsaturated nitrile monomer, (2) 1 to 80% by weight of units of a fluorine-containing vinyl monomer and (3) up to 20% by weight of units of a conjugated diene monomer, with the balance being (4) units of a hydrogenated conjugated diene monomer, wherein the sum of the contents of the monomer units (1) and (2) is 30 to 90% by weight and the sum of the contents of the monomer units (3) and (4) is 10 to 70% by weight.

2. The copolymer rubber according to claim 1 wherein the unsaturated nitrile monomer is selected from the group consisting of acrylonitrile, methacrylonitrile and α-chloroacrylonitrile.

3. The copolymer rubber according to claim 1 wherein the fluorine-containing vinyl monomer is selected from the group consisting of fluoroalkyl acrylates and fluoroalkyl methacrylates, having 3 to 21 fluorine atoms in the fluoroalkyl group.

4. The copolymer rubber according to claim 1 wherein the amount of the monomer units (1) is 10 to 35% by weight, the amount of the monomer units (2) is 5 to 60% by weight, and the sum of the amounts of the monomer units (1) and (2) is 40 to 90% by weight.

5. The copolymer rubber according to claim 1 wherein the conjugated diene monomer is selected from the group consisting of butadiene and isoprene.

6. The copolymer rubber according to claim 1 wherein the amount of the monomer units (3) is up to 15% by weight and the sum of the amounts of the monomer units (3) and (4) is 10 to 60% by weight.

7. A rubber composition comprising 25 to 90% by weight, based on the rubber composition, of a nitrile group-containing, highly saturated copolymer rubber and 75 to 10% by weight, based on the rubber composition, of additives; the copolymer claim of said nitrile group-containing, highly saturated copolymer rubber comprising, based on the weight of the copolymer chain (1) 5 to 40% by weight of units of an unsaturated nitrile monomer, (2) 1 to 80% by weight of units of a fluorine-containing vinyl monomer and (3) up to 20% by weight of units of a conjugated diene monomer, with the balance being (4) units of a hydrogenated conjugated diene monomer, wherein the sum of the contents of the monomer units (1) and (2) is 30 to 90% and the sum of the contents of the monomer units (3) and (4) is 10 to 70% by weight.

8. The rubber composition according to claim 7 wherein the unsaturated nitrile monomer is selected from the group consisting of acrylonitrile, methacrylonitrile and α-chloroacrylonitrile.

9. The rubber composition according to claim 7 wherein the fluorine-containing vinyl monomer is selected from the group consisting of fluoroalkyl acrylates and fluoroalkyl methacrylates, having 3 to 21 fluorine atoms in the fluoroalkyl group.

10. The rubber composition according to claim 7 wherein the amount of the monomer units (1) is 10 to 35% by weight, the amount of the monomer units (2) is 5 to 60% by weight, and the sum of the amounts of the monomer units (1) and (2) is 40 to 90% by weight.

11. The rubber composition according to claim 7 wherein the conjugated diene monomer is selected from the group consisting of butadiene and isoprene.

12. The rubber composition according to claim 7 wherein the amount of the monomer units (3) is up to 15% by weight and the sum of the amounts of the monomer units (3) and (4) is 10 to 60% by weight.

* * * * *